US012640789B2

(12) United States Patent
Burasa et al.

(10) Patent No.: US 12,640,789 B2
(45) Date of Patent: May 26, 2026

(54) GENERATING AND DETECTING RADIO FREQUENCY BEAMS

(71) Applicant: HUAWEI TECHNOLOGIES CO., LTD., Shenzhen (CN)

(72) Inventors: Pascal Burasa, Montreal (CA); Jie Deng, Montreal (CA); Ke Wu, Saint-Laurent (CA)

(73) Assignee: HUAWEI TECHNOLOGIES CO, LTD., Shenzhen (CN)

( * ) Notice: Subject to any disclaimer, the term of this patent is extended or adjusted under 35 U.S.C. 154(b) by 207 days.

(21) Appl. No.: 18/526,251

(22) Filed: Dec. 1, 2023

(65) Prior Publication Data

US 2025/0183957 A1      Jun. 5, 2025

(51) Int. Cl.
H04B 7/06          (2006.01)
H04B 7/08          (2006.01)

(52) U.S. Cl.
CPC ............. H04B 7/0617 (2013.01); H04B 7/08 (2013.01)

(58) Field of Classification Search
CPC ............................... H04B 7/0617; H04B 7/08
USPC .......................................................... 375/295
See application file for complete search history.

(56) References Cited

U.S. PATENT DOCUMENTS

2022/0247075 A1*   8/2022   Jalili .......................... H01Q 3/30
2025/0039805 A1*   1/2025   Eder .................... H04B 7/0617

OTHER PUBLICATIONS

P. H. Siegel, "Terahertz technology," IEEE Trans. Microw. Theory Techn., vol. 50, No. 3, pp. 910-928, Mar. 2002.
M. Tonouchi, "Cutting-edge terahertz technology", Nature Photonics, vol. 1, pp. 97-105, 2007.
D. L. Woolard, "Terahertz frequency sensing and imaging: A time of reckoning future applications?", Proc. IEEE, vol. 93, No. 10, pp. 1722-1743, Oct. 2005.
P. Rodriguez-Vazquez, J. Grzyb, N. Sarmah, B. Heinemann, U. R. Pfeiffer, "A 65 Gbps QPSK one meter wireless link operating at a 225-255 GHz tunable carrier in a SiGe HBT technology", Proc. IEEE Radio Wireless Symp., pp. 146-149, 2018.
R. Han, E. Afshari, "A CMOS high-power broadband 260-GHz radiator array for spectroscopy", IEEE J. Solid-State Circuits, vol. 48, No. 12, pp. 3090-3104, Dec. 2013.
P. Y. Chiang, Z. Wang, O Momeni and P. Heydari., "A Silicon-Based 0.3 THz Frequency Synthesizer With Wide Locking Range", IEEE J. Solid-State Circuits, vol. 49, No. 12, pp. 2951-2963, Dec. 2014.

(Continued)

*Primary Examiner* — Fitwi Y Hailegiorgis
(74) *Attorney, Agent, or Firm* — Tim Tingkang Xia, Esq.; Troutman Pepper Locke LLP

(57)          ABSTRACT

A device for generating a radio frequency (RF) beam includes an array of independent unit cells. Each unit cell includes RF sources configured to generate terahertz (THz) signals, and antennas coupled to the RF sources for transmitting THz waves based on the THz signals. The device further includes switches configured to selectively bias each unit cell between an activated state in which the antennas of the unit cell are operable to transmit the THz waves, and a deactivated state in which the antennas of the unit cell are prevented from transmitting the THz waves. The device further includes circuitry configured to control the switches to generate the RF beam based on the THz waves transmitted by the antennas of each unit cell in the activated state.

18 Claims, 11 Drawing Sheets

(56)                   References Cited

OTHER PUBLICATIONS

J. G. Lee, T. H. Jang, G. H. Park, H. S. Lee, C. W. Byeon and C. S. Park, "A 60-GHz Four-Element Beam-Tapering Phased-Array Transmitter With a Phase-Compensated VGA in 65-nm CMOS," in IEEE Transactions on Microwave Theory and Techniques, vol. 67, No. 7, pp. 2998-3009, Jul. 2019.

I. Abdo et al., "300-GHz-Band Four-Element CMOS-InP Hybrid Phased-Array Transmitter With 36circ Steering Range," in IEEE Microwave and Wireless Technology Letters, vol. 33, No. 6, pp. 887-890, Jun. 2023.

Hooman, S. et al. "A 4 x 4 Distributed Multi-Layer Oscillator Network for Harmonic Injection and THz Beamforming with 14dBm EIRP at 416 GHz in a Lensless 65 NM CMOS IC", 2020 IEEE International Solid-State Circuits Conference—(ISSCC), San Francisco, CA, USA, Feb. 16-20, 2020, pp. 456-458.

Keivaan, S.A., et al. "Virtual Transceiver Matrix for Future Programmable Wireless Sensing and Communication Frontends", 2023 IEEE MTT-S International Conference on Numerical Electromagnetic and Multiphysics Modeling and Optimization (NEMO), Jun. 28-30, 2023, Winnipeg, MB, Canada, pp. 87-90.

Reynaert, P. et al. "THz Arrays in CMOS", 2020 Third International Workshop on Mobile Terahertz System (IWMTS) Jul. 1-2, 2020, Essen, Germany, pp. 1-5 https://lirias.kuleuven.be/bitstream/handle/123456789/660049/postprint.pdf?sequence=2.

Jameson, S. et al., "Sub-harmonic wireless injection locking of a THz CMOS chip array", 2015 IEEE Radio Frequency Integrated Circuits Symposium, May 17-19, 2015, Phoenix, AZ, USA, pp. 115-118.

Hu, Z. et al. "A 32-Unit 240-GHGz Heterodyne Receiver Array in 65-nm CMOS With Array-Wide Phase Locking", IEEE Journal of Solid-State Circuits, vol. 54, No. 5, May 2019, pp. 1-12.

Keivaan, S.A. et al., "Virtual Receiver Matrix and Combinatory Analog Operations for Future Multifunction Reconfigurable Sensing and Communication Wireless Systems", IEEE Transactions on Microwave Theory and Techniques, vol. 71, No. 1, Jan. 2023.

* cited by examiner

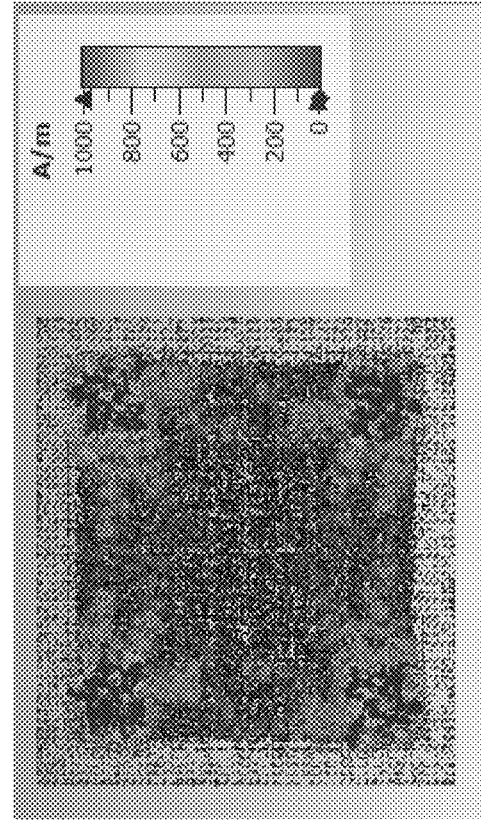
FIG. 8C
FIG. 8A
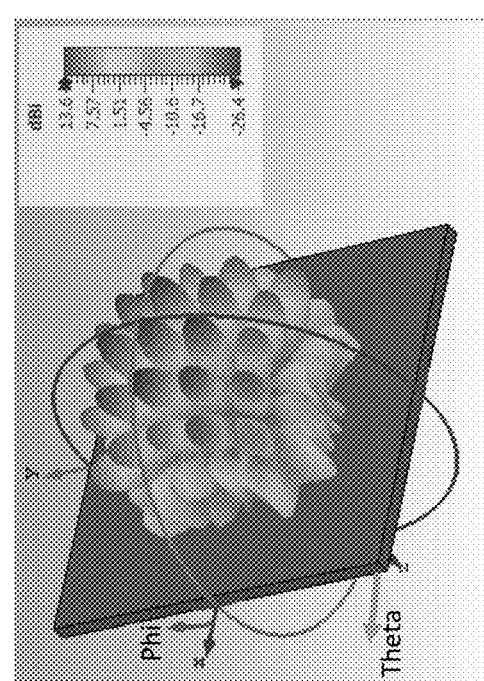
FIG. 8B

GENERATING AND DETECTING RADIO FREQUENCY BEAMS

FIELD

The present disclosure relates to wireless communications and in particular to devices and methods for generating and detecting radio frequency beams.

BACKGROUND

Terahertz (THz) wireless communications and sensing technologies have recently attracted much attention in the research and development community. This has been mostly driven by a strong desire to cover the ever-increasing and ubiquitous needs for higher data-rates, smart connectivity, as well as accurate and rapid location and identification services.

The THz band, however, is still relatively unexplored compared to both its neighboring microwave and optical bands, in part due to the lack of affordable and efficient THz devices. Typically, expensive and bulky compound semiconductor devices have been used to develop THz systems, and in many cases extreme operating conditions, such as low temperatures, are required to operate such systems. These factors have therefore limited the evolution of THz technology-based applications.

Due to the progress that has been made with silicon processing technologies and integrated circuits, commercially-affordable THz systems can now be envisaged. However, generating a practically-usable THz signal on-chip, intended for communications and sensing applications, is still very challenging. In particular, since today's CMOS-based THz integrated circuits operate above their cut-off frequency, they still exhibit low radiated output power. This inherently renders the generation and radiation of practical THz power levels on-chip a challenging task.

Furthermore, the "pencil beam" (high directivity) of a THz signal is sensitive to the radiation angle (in the case of a transmitter) or the incident angle (in case of a receiver). Therefore, a beam steering and/or shaping mechanism should be integrated alongside the THz source or receiver. However, while phased arrays have been widely demonstrated in both the neighboring microwave and optical bands, in the THz band these phased arrays are almost non-existent due to the absence of efficient and affordable THz devices such as coherent THz sources, amplifiers, and phase shifters. In addition, integrating a beam steering and/or shaping mechanism on-chip is even more challenging since, as described above, today's CMOS-based THz developments using advanced silicon technology nodes still operate above their cut-off frequency, therefore making the on-chip amplification of a THz signal inefficient or quasi-impossible.

SUMMARY

According to a first aspect of the disclosure, there is provided a device for generating a radio frequency (RF) beam, comprising: an array of independent unit cells, each unit cell comprising: one or more RF sources configured to generate one or more terahertz (THz) signals; and one or more antennas coupled to the one or more RF sources for transmitting THz waves based on the one or more THz signals; switches configured to selectively bias each unit cell between: an activated state in which the one or more antennas of the unit cell are operable to transmit the THz waves; and a deactivated state in which the one or more antennas of the unit cell are prevented from transmitting the THz waves; and circuitry configured to control the switches to generate the RF beam based on the THz waves transmitted by the one or more antennas of each unit cell in the activated state. As a result, the device for generating the RF beam may assist in the development of relatively low-cost and high-density THz power-generating integrated circuits and systems.

The array, the switches, and the circuitry may be provided on a single integrated circuit. The generated THz beam may therefore be programmed on-chip.

The device may further comprise an injection-locking source configured to transmit an injection-locking signal to the array for assisting the one or more THz signals generated by the one or more RF sources of each unit cell in the activated state to be coherent with the one or more THz signals generated by the one or more RF sources of each other unit cell in the activated state. As a result, a more coherent signal spectrum may be obtained.

The injection-locking signal may be a sub-harmonic of the one or more THz signals generated by the one or more RF sources of each unit cell.

The array, the switches, and the circuitry may be provided on a single integrated circuit, and the injection-locking source may be external to the single integrated circuit.

For at least one of the unit cells, the one or more antennas of the at least one unit cell may comprise one or more slot antennas.

For at least one of the unit cells, the one or more antennas of the at least one unit cell may comprise: one or more first antennas for transmitting, according to a first polarization, THz waves based on the one or more THz signals; and one or more second antennas for transmitting, according to a second polarization, THz waves based on the one or more THz signals. As a result, the throughput of the device may be increased.

The one or more RF sources may be configured to generate one or more THz signals having one or more frequencies from 100 GHz to 3 THz.

According to a further aspect of the disclosure, there is provided a device for detecting a radio frequency (RF) beam, comprising: an array of independent unit cells, each unit cell comprising: one or more antennas for receiving terahertz (THz) waves; and one or more RF receivers coupled to the one or more antennas and configured to generate one or more THz signals based on the THz waves; and switches configured to selectively bias each unit cell between: an activated state in which the one or more antennas of the unit cell are operable to receive the THz waves; and a deactivated state in which the one or more antennas of the unit cell are prevented from receiving the THz waves; and circuitry configured to control the switches to detect the RF beam based on the THz waves received by the one or more antennas of each unit cell in the activated state.

The array, the switches, and the controller may be provided on a single integrated circuit.

The device may further comprise an injection-locking source configured to transmit an injection-locking signal to the array for assisting the one or more THz signals generated by the one or more RF receivers of each unit cell in the activated state to be coherent with the one or more THz signals generated by the one or more RF receivers of each other unit cell in the activated state.

The injection-locking signal may be a sub-harmonic of the one or more THz signals generated by the one or more RF receivers of each unit cell.

The array, the switches, and the controller may be provided on a single integrated circuit, and the injection-locking source may be external to the single integrated circuit.

For at least one of the unit cells, the one or more antennas of the at least one unit cell may comprise one or more slot antennas.

For at least one of the unit cells, the one or more antennas of the at least one unit cell may comprise: one or more first antennas for receiving THz waves according to a first polarization; and one or more second antennas for receiving THz waves according to a second polarization.

The one or more RF receivers may be configured to generate one or more THz signals having one or more frequencies from 100 GHz to 3 THz.

According to a further aspect of the disclosure, there is provided a method of generating a radio frequency (RF) beam, comprising: controlling one or more switches to selectively bias each unit cell, in an array of independent unit cells, to either: an activated state; or a deactivated state; and for each unit cell in the activated state: generating, using one or more RF sources, one or more terahertz (THz) signals; and transmitting, using one or more antennas, THz waves based on the one or more THz signals, wherein the RF beam is generated based on the THz waves transmitted by the one or more antennas of each unit cell in the activated state.

The method may further comprise steering the generated RF beam by controlling at least one of the switches to selectively bias at least one of the unit cells from its current state to a different state.

According to a further aspect of the disclosure, there is provided a method of detecting a radio frequency (RF) beam, comprising: controlling one or more switches to selectively bias each unit cell, in an array of independent unit cells, to either: an activated state; or a deactivated state; and for each unit cell in the activated state: receiving, using one or more antennas, terahertz (THz) waves; and generating, using one or more RF receivers, one or more THz signals based on the THz waves.

The method may further comprise controlling at least one of the switches to selectively bias at least one of the unit cells from its current state to a different state in order improve detection of the RF beam.

This summary does not necessarily describe the entire scope of all aspects. Other aspects, features, and advantages will be apparent to those of ordinary skill in the art upon review of the following description of specific embodiments.

DRAWINGS

Embodiments of the disclosure will now be described in detail in conjunction with the accompanying drawings of which:

FIGS. 8A-8C show respectively different views of a sixth simulated radiation pattern and a fifth simulated current distribution, according to an embodiment of the disclosure;

DETAILED DESCRIPTION

The present disclosure seeks to provide novel devices and methods for generating and detecting RF beams. While various embodiments of the disclosure are described below, the disclosure is not limited to these embodiments, and variations of these embodiments may well fall within the scope of the disclosure which is to be limited only by the appended claims.

According to embodiments of the disclosure, there is described a device for generating an RF beam, comprising an array of independent unit cells. Each unit cell includes RF sources configured to generate THz signals, and antennas coupled to the RF sources for transmitting THz waves based on the THz signals. The device further includes switches configured to selectively bias each unit cell between an activated state in which the antennas of the unit cell are operable to transmit the THz waves, and a deactivated state in which the antennas of the unit cell are prevented from transmitting the THz waves. The device further includes circuitry configured to control the switches to generate the RF beam based on the THz waves transmitted by the antennas of each unit cell in the activated state. According to some implementations, the array, the switches, and the circuitry may be provided on a single integrated circuit. According to some implementations, the device may further include an injection-locking source configured to transmit an injection-locking signal to the array for assisting the THz signals generated by the RF sources of each unit cell in the activated state to be coherent with the THz signals generated by the RF sources of each other unit cell in the activated state.

As a result, embodiments of the disclosure may enable the development of relatively low-cost and high-density THz power-generating integrated circuits and systems. The multi-signal on-chip system architecture described herein may further allow for the co-integration of densely-spaced THz sources with radiating elements on the same substrate, while also allowing the power generated by each THz source to be efficiently combined in order to shape and/or steer the desired RF beam. Furthermore, devices according to embodiments of the disclosure may allow, from a single and fully-integrated CMOS die, the generation and shaping of a usable THz beam for coherent THz communication and sensing applications.

Embodiments of the disclosure will now be described in detail with reference to the drawings.

Figure 1:
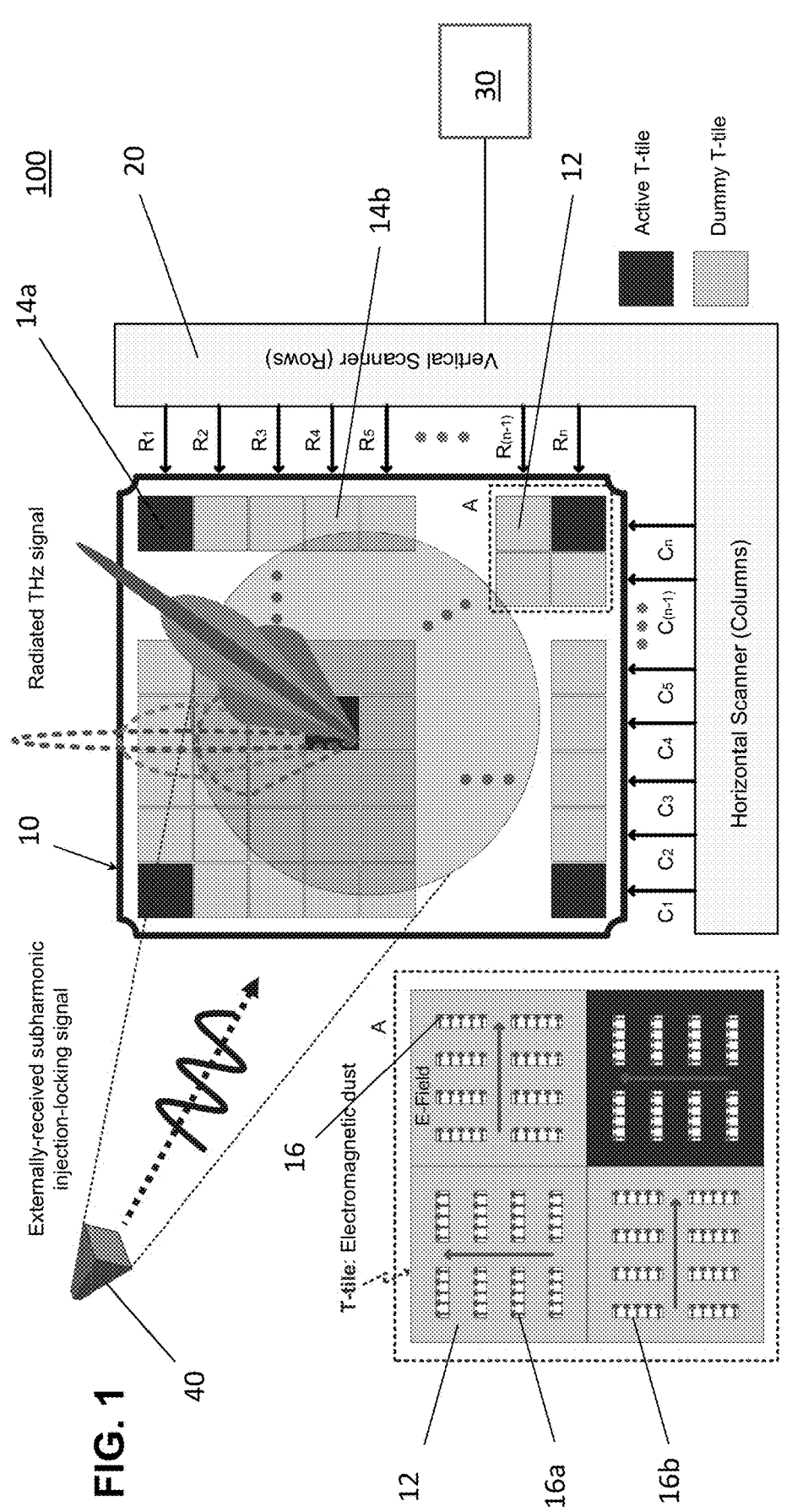
FIG. 1 is a schematic diagram of a device for generating a radio frequency (RF) beam, according to an embodiment of the disclosure.

As illustrated in FIG. 1, there is shown a device 100 for generating an RF beam. Device 100 includes a patch antenna array 10 of individual unit cells 12. As described in further detail below, each unit cell 12 may be individually and selectively controlled or biased (e.g., by applying a biasing DC voltage) to be in either an activated state (such as unit cell 14a) or a deactivated state (such as unit cell 14b). Device 100 further includes switches 20 such as horizontal and vertical scanners that are configured to selectively bias each unit cell 12 into one or the other of its two states. Switches 20 are under control of circuitry 30 (such as a microcontroller) which may be programmed to switch one or more of unit cells 12 from one state into the other state, depending on the desired characteristics of the RF beam that is to be shaped, steered, or otherwise generated.

A magnified view of four unit cells 12 is shown in the bottom left-hand corner of FIG. 1. Each unit cell 12 includes a number of antennas comprising slot antennas 16a and slot antennas 16b (more generally, "antennas 16") formed therein. Antennas 16 are configured to emit THz waves as will be described in further detail below. The orientation of the slots may be configured such that each antenna 16 may only emit THz waves according to a certain polarization. For example, slot antennas 16a may be configured to only emit THz waves according to a first polarization (such as a horizontal polarization), whereas slot antennas 16b may be configured to only emit THz waves according to a second polarization (such as a vertical polarization) orthogonal to the first polarization. This may increase the throughput of device 100.

An injection-locking source 30 is included in device 100 and is configured to emit an injection-locking signal to array 10. As described in further detail below, the injection-locking signal may assist antennas 16 of each unit cell 12 to emit THz waves in coherence with each other antenna 16 of each other unit cell 12 that is emitting THz waves.

Figure 2:
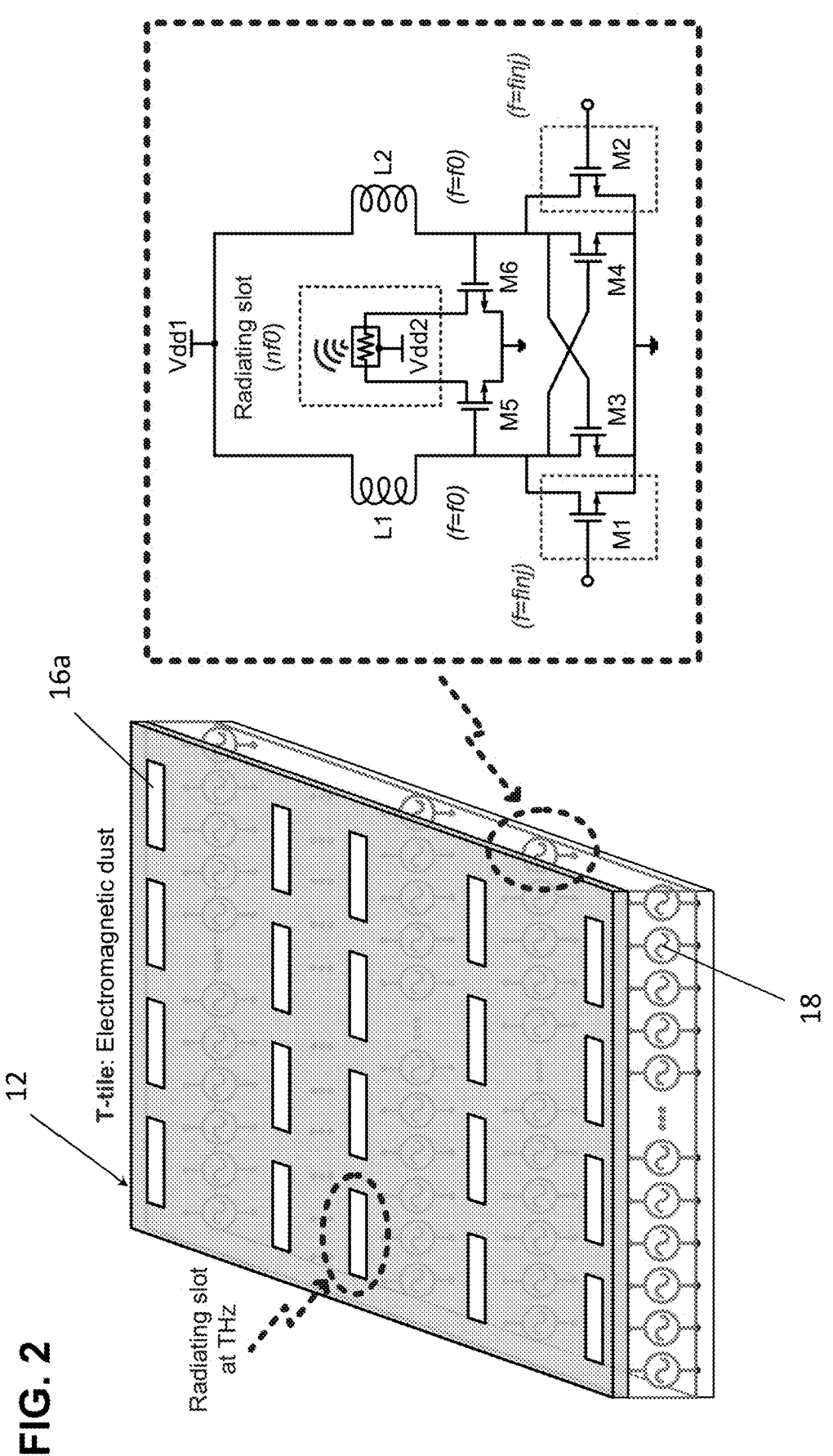
FIG. 2 is a schematic diagram of a unit cell configured to transmit THz waves, according to an embodiment of the disclosure.
Figure 3B:
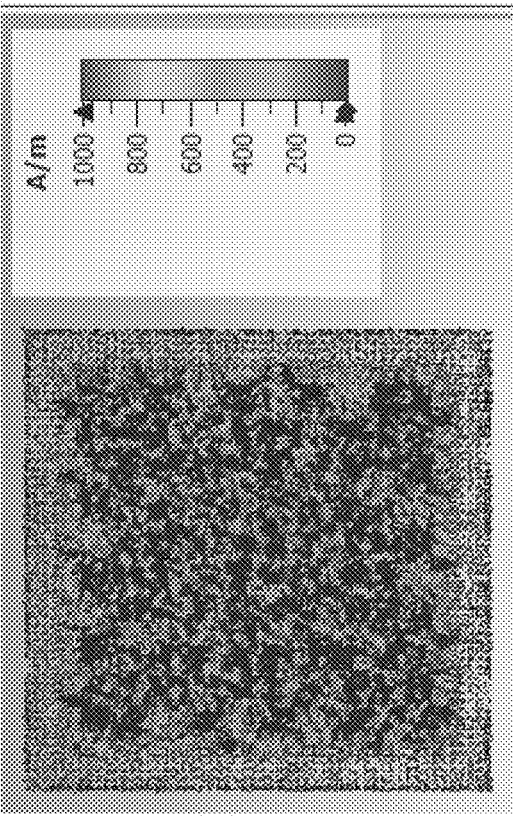
FIGS. 3A and 3B show respectively a first simulated radiation pattern and a first simulated current distribution, according to an embodiment of the disclosure.
Figure 3A:
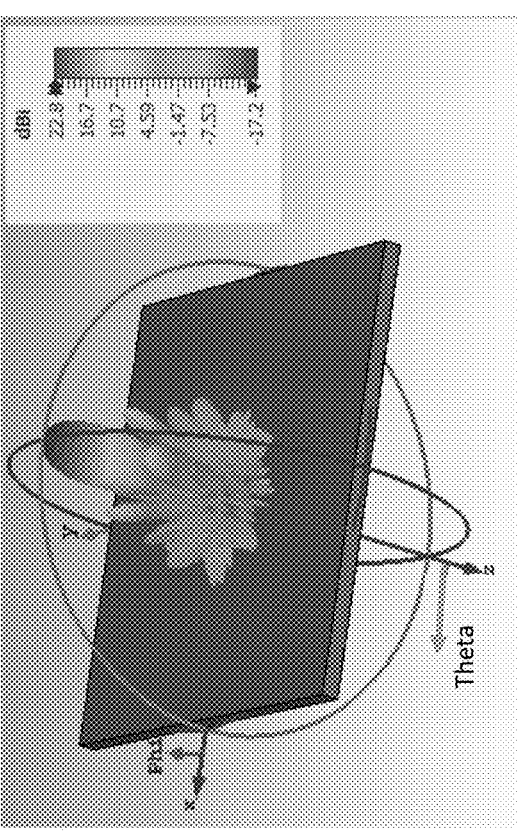
Figure 4B:
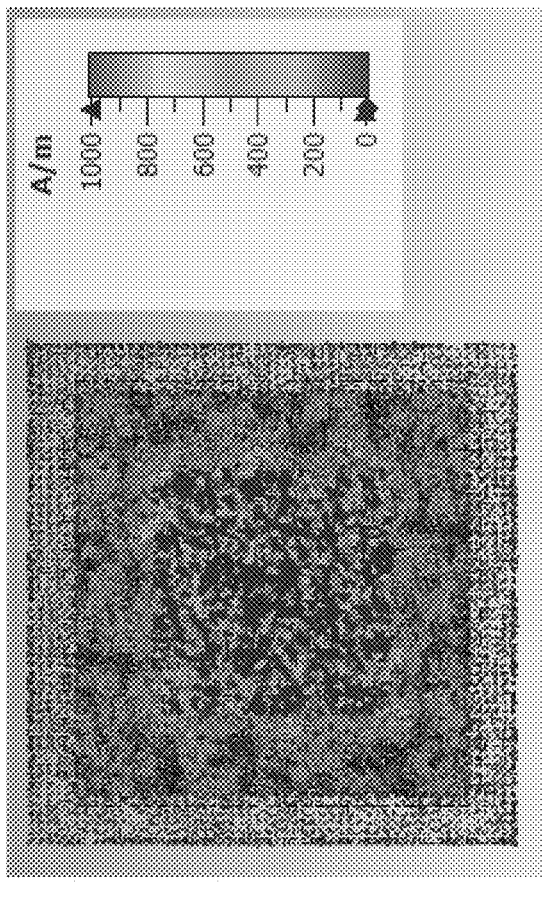
FIGS. 4A and 4B show respectively a second simulated radiation pattern and a second simulated current distribution, according to an embodiment of the disclosure.
Figure 4A:
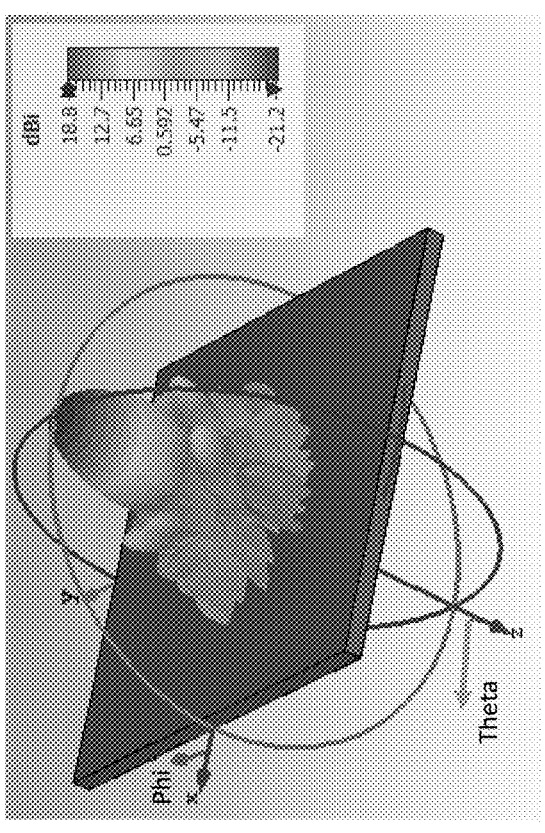
Figure 5B:
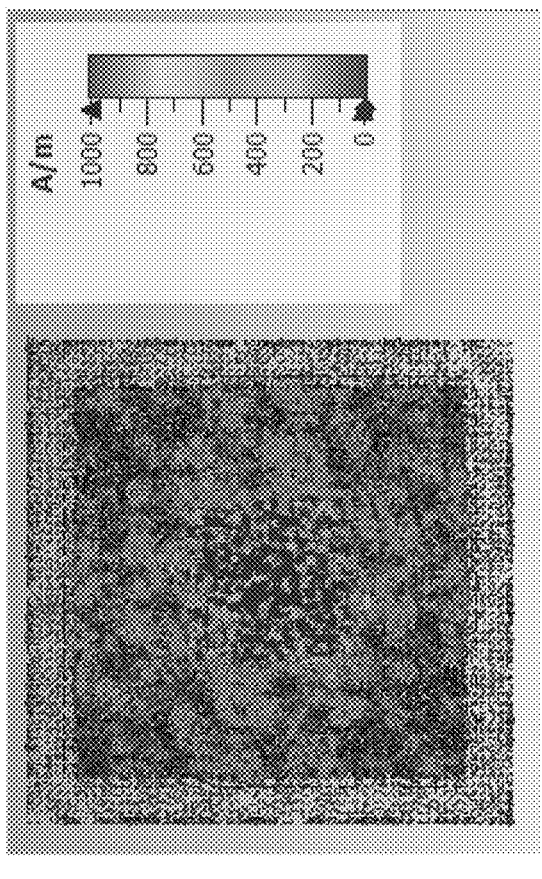
FIGS. 5A and 5B show respectively a third simulated radiation pattern and a third simulated current distribution, according to an embodiment of the disclosure.
Figure 5A:
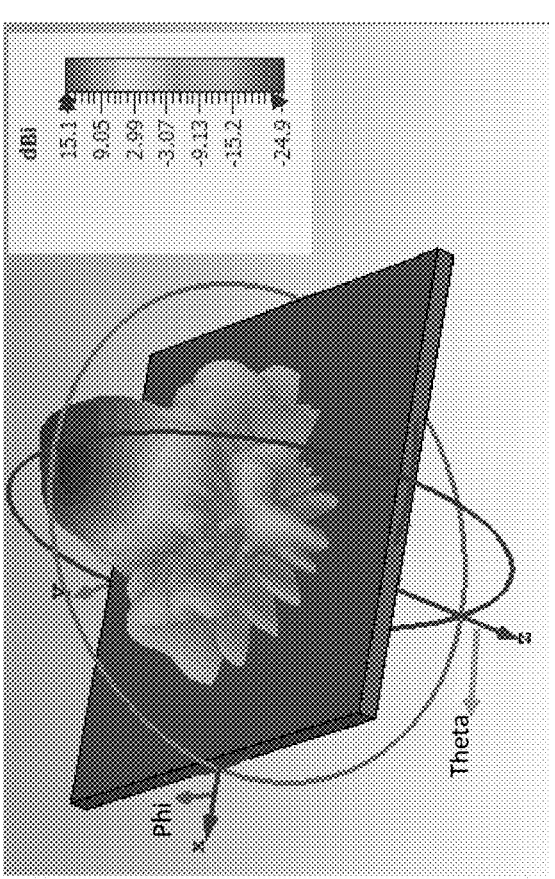
Figure 6B:
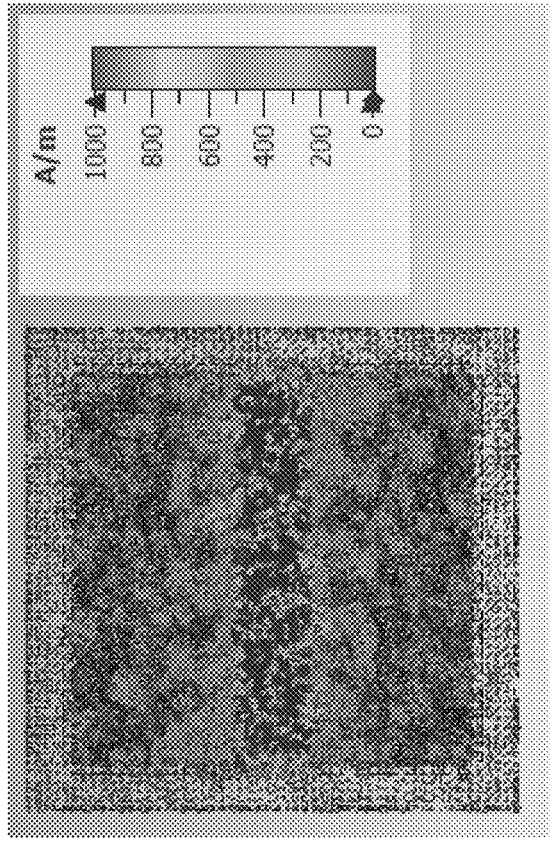
FIGS. 6A and 6B show respectively a fourth simulated radiation pattern and a fourth simulated current distribution, according to an embodiment of the disclosure.
Figure 6A:
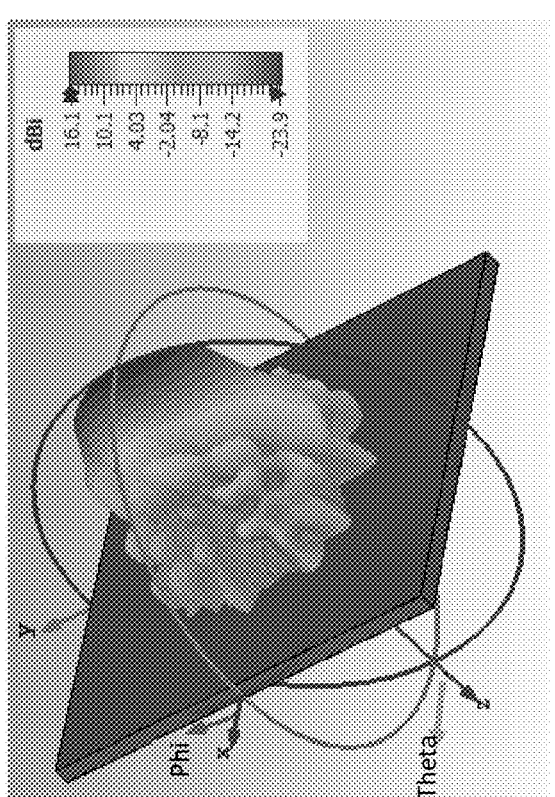
Figure 7B:
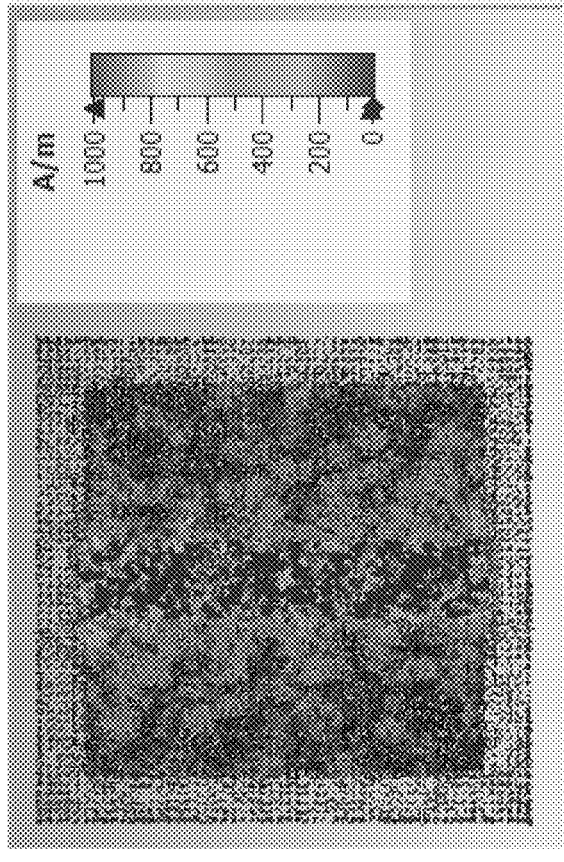
FIGS. 7A and 7B show respectively a fifth simulated radiation pattern and a fifth simulated current distribution, according to an embodiment of the disclosure.
Figure 7A:
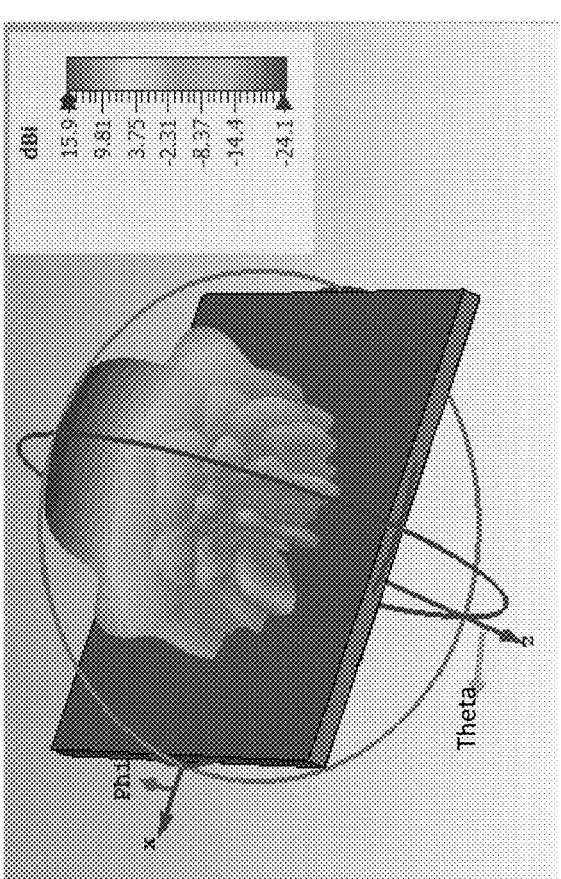

Turning to FIG. 2, there is shown a single unit cell 12 in more detail. As can be seen, a number of RF sources 18 are coupled to slot antennas 16a. Each slot antenna 16a of unit cell 12 may be coupled to any number of RF sources 18. Each RF source 18 is configured to generate a THz signal. A THz signal may be an electromagnetic signal having a frequency in the range of 100 GHz to 3 THz. An example implementation of an RF source 18 is shown on the right-hand side of FIG. 2.

During operation of device 100, the RF sources 18 of each unit cell 12 are caused to generate respective THz signals. The THz signals are received at antennas 16 of each unit cell 12, and antennas 16 emit THz waves as a result of their coupling to RF sources 18. The specific unit cells 12 of array 10 that emit THz waves are the unit cells 12 that are in their activated state, based on the biases applied by switches 20 under the control of circuitry 30. In other words, each unit cell 12 of array 10 may be individually and selectively controlled to either emit THz waves or not emit THz waves. With few practical limitations, any THz beam may therefore be shaped and/or steered by selectively and controllably activating select ones of unit cells 12.

Preferably, array 10, switches 20, and controller 30 are provided on a single integrated circuit (i.e., on a single chip), although this is not required.

Patch antenna array 10 may therefore act as a subharmonic injection-locking element at f0 (the patch resonance), while each slot antenna 16a, 16b may act as a radiating element of injection-locked and combined THz power at nf0 (the resonance of the slot antenna). By independently (from the point of view of the applied DC voltage) selecting and activating each unit cell 12, or any combination of unit cells 12 (by applying a DC biasing voltage through the different rows and columns of array 10, using switches 20), the generated THz beam may be programmed on-chip. It is worth noting that a practically infinite number of different current distribution combinations can be achieved on-chip, by using a practically infinite number of row and column combinations (i.e., applied DC-biasing combinations). As a result, there is a practically infinite number of ways of digitally or intelligently programming the properties of the radiated THz beam.

Devices according to embodiments of the disclosure may be low-cost, efficient, and may provide a relatively simple way of generating, radiating, and beam programming (at a chip level) a practically usable THz signal for coherent THz communication and sensing systems.

FIGS. 3A-5B show simulated radiation patterns and current distributions of a device according to an embodiment of the disclosure, illustrating slots radiating around 280 GHz.

These simulations highlight an example of how the antenna gain may be programmed by accordingly activating different numbers and combinations of unit cells.

FIGS. 6A-7B show further simulated radiation patterns and current distributions, illustrating slots radiating around 280 GHz. These simulations further highlight an example of how the beam may be shaped by activating select unit cells.

FIGS. 8A-8C show further simulated radiation patterns and current distributions, illustrating slots radiating around 280 GHz. These simulations further highlight an example of how multiple beams may be shaped by activating select unit cells.

For each of the simulations in FIGS. 3A-8C, the length and width of the array are 6 mm, and the length and width of the slots are 150×30 μm, respectively, implemented using the 65-nm standard CMOS process.

Figure 9:
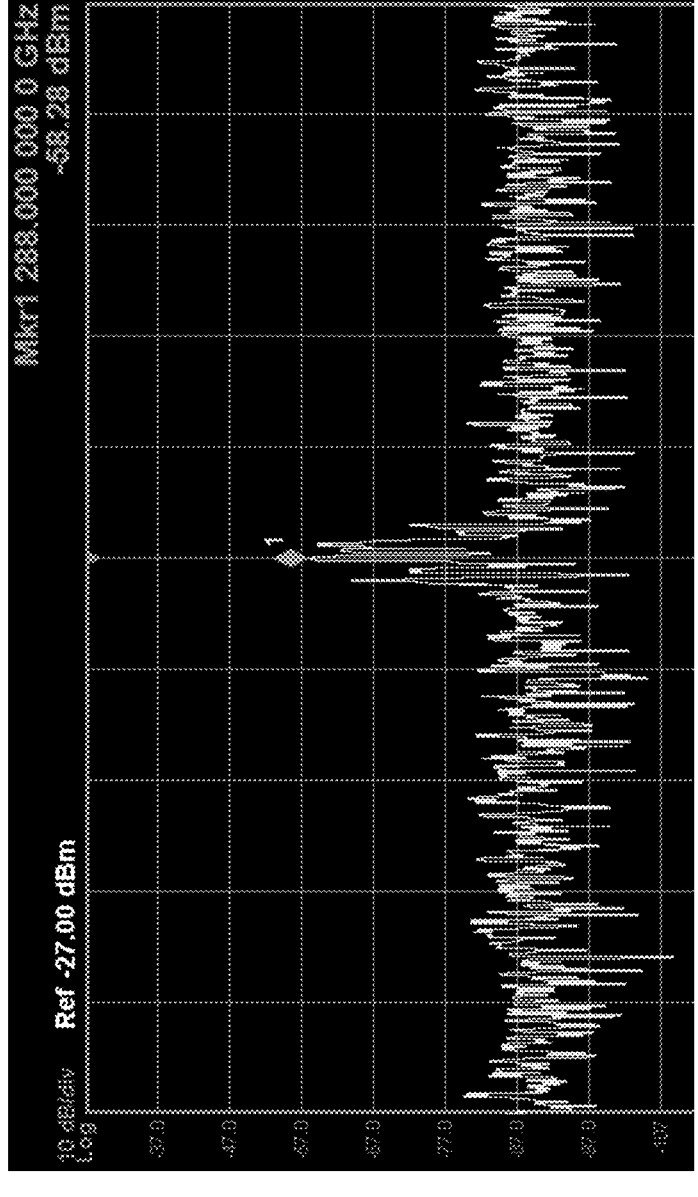
FIG. 9 shows a measured spectrum of an RF beam generated without injection locking, according to an embodiment of the disclosure.
Figure 10:
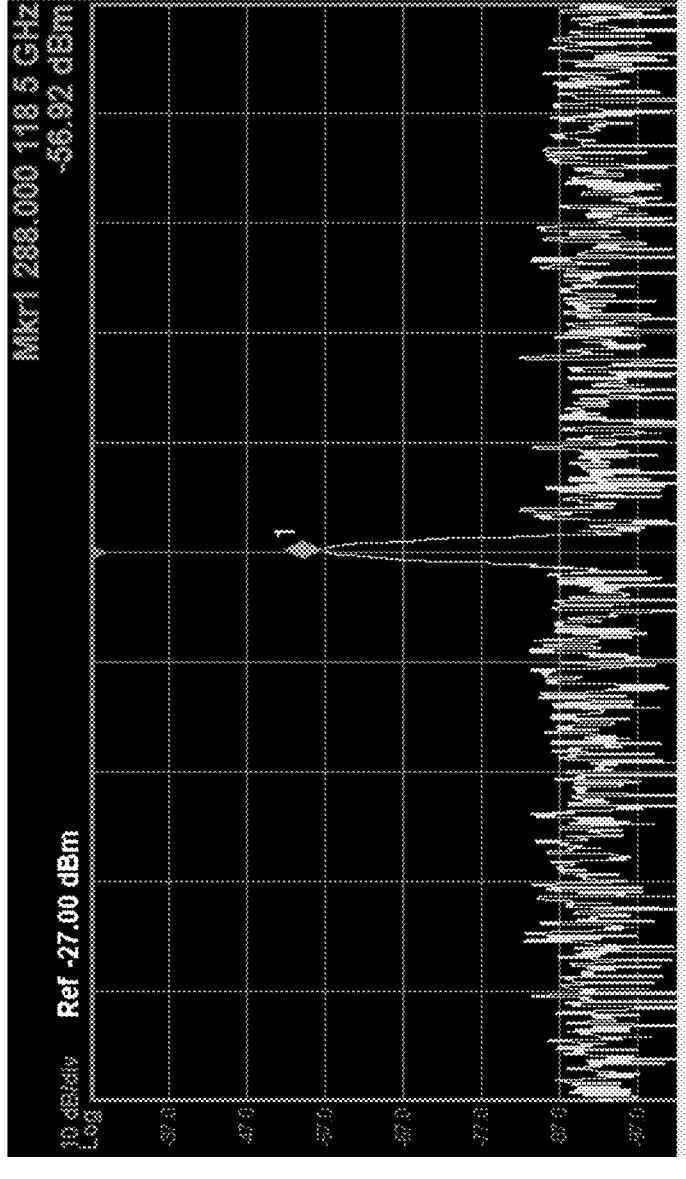
FIG. 10 shows a measured spectrum of an RF beam generated with injection locking, according to an embodiment of the disclosure.

FIGS. 9 and 10 show, respectively, a measured spectrum of an RF beam generated without injection locking and with injection locking. In particular, in the case of FIG. 10, an injection-locking signal of about 90 GHz is used to assist the THz signals generated by the RF sources of each unit cell in the activated state to be coherent with the THz signals generated by the RF sources of each other unit cell in the activated state. As can be seen, FIG. 10 demonstrates that a coherent signal spectrum is obtained when the THz sources are injection-locked to the external injection-locking signal, as opposed to the incoherent signal spectrum shown in FIG. 9 when the THz sources are in a free-running mode.

Figure 11:
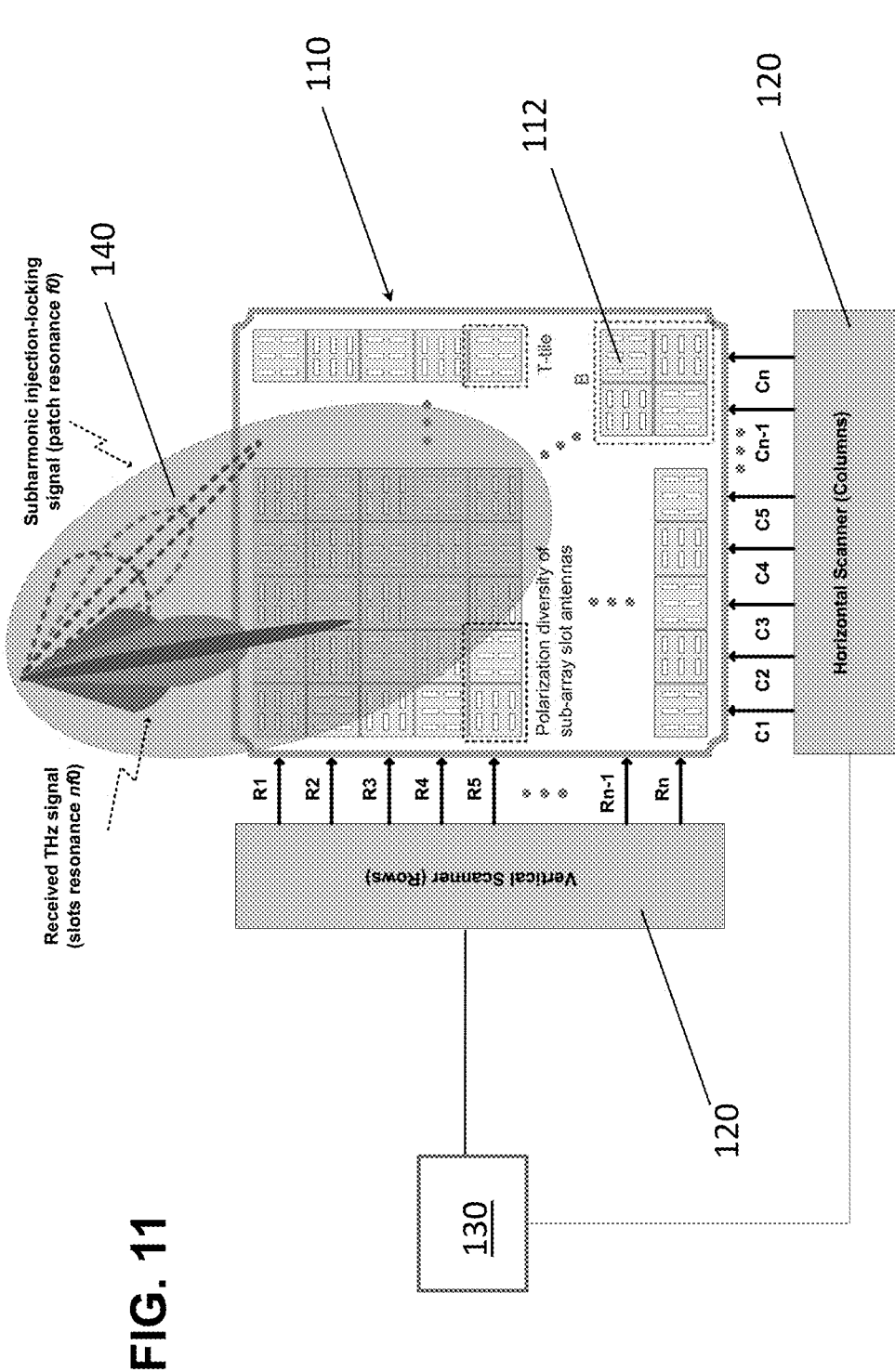
FIG. 11 is a schematic diagram of a device for detecting a radio frequency RF beam, according to an embodiment of the disclosure.

While the architecture shown in FIG. 1 generally relates to a transmitter, the same principles may be used in the context of a receiver. For example, referring to FIG. 11, there is shown a device 200 for receiving or otherwise detecting an RF THz beam, with the same elements as in FIG. 1 labelled using similar reference numbers. In particular, unit cells 12 of device 100 can be redesigned to serve as unit cells 112 in FIG. 11 with RF receivers instead of RF sources. The receiver architecture shown in FIG. 11 may enable the reception of both a subharmonic injection-locking signal 140 at the resonance frequency f0 of the patch antenna array 110 as well as the THz signal at each slot antenna's resonance frequency nf0. Receiver device 200 may therefore be suitable for efficient, on-chip reception of a THz signal, by using densely-spaced sub-harmonically injection-locked THz receivers. By selectively activating unit cells 112 through DC-biasing applied using switches 120 under the control of circuitry 130, the receiving unit cells may be programmed according to the incident THz beam properties, therefore enabling a practically and efficient way of data reception and recovery.

Methods of using the devices described herein include a method of generating a radio frequency (RF) beam. According to such a method, in a first operation, one or more switches are controlled to selectively bias each unit cell, in the array of independent unit cells, to either an activated state or a deactivated state. Then, in a second operation, and for each unit cell in the activated state, one or more THz signals are generated using one or more RF sources, and one or more antennas are used to transmit THz waves based on the one or more THz signals. The RF beam is generated based on the THz waves transmitted by the one or more antennas of each unit cell in the activated state.

In addition, methods of using the devices described herein include a method of detecting a radio frequency (RF) beam. According to such a method, in a first operation, one or more switches are controlled to selectively bias each unit cell, in the array of independent unit cells, to either an activated state or a deactivated state. Then, in a second operation, and for each unit cell in the activated state, one or more antennas are used to receive THz waves, and one or more RF receivers are used to generate one or more THz signals based on the THz waves.

As can be seen, there have been described devices and methods for generating and detecting THz RF beams. The beam may be efficiently generated, shaped, and steered on-chip (e.g., from a fully-integrated single CMOS die), and used for coherent THz communication and sensing systems. Such devices may be low-cost, exhibit low-power consumption, and miniaturized. Using devices according to the disclosure, the on-chip ability to digitally program different beam properties such as the polarization, gain, shape, and the number of beams (e.g., single or multiple beams in order to suitably orient the beam to different communication or sensing angles) may be developed.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

Use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}).

The phrase "at least one of" and similar phrases are not intended to convey a requirement that each possible item must be present, although each possible item may be present.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

What is claimed is:

1. A device for generating a radio frequency (RF) beam, comprising:
an array of independent unit cells, each unit cell comprising:
one or more RF sources configured to generate one or more terahertz (THz) signals; and
one or more antennas coupled to the one or more RF sources for
transmitting THz waves based on the one or more THz signals;
switches configured to selectively bias each unit cell between:
an activated state in which the one or more antennas of the unit cell are operable to transmit the THz waves; and
a deactivated state in which the one or more antennas of the unit cell are prevented from transmitting the THz waves;
circuitry configured to control the switches to generate the RF beam based on the THz waves transmitted by the one or more antennas of each unit cell in the activated state; and
an injection-locking source configured to transmit an injection-locking signal to the array for assisting the one or more THz signals generated by the one or more RF sources of each unit cell in the activated state to be coherent with the one or more THz signals generated by the one or more RF sources of each other unit cell in the activated state.

2. The device of claim 1, wherein the array, the switches, and the circuitry are provided on a single integrated circuit.

3. The device of claim 1, wherein the injection-locking signal is a sub-harmonic of the one or more THz signals generated by the one or more RF sources of each unit cell.

4. The device of claim 1, wherein:
the array, the switches, and the circuitry are provided on a single integrated circuit; and
the injection-locking source is external to the single integrated circuit.

5. The device of claim 1, wherein, for at least one of the unit cells, the one or more antennas of the at least one unit cell comprise one or more slot antennas.

6. The device of claim 1, wherein, for at least one of the unit cells, the one or more antennas of the at least one unit cell comprise:
one or more first antennas for transmitting, according to a first polarization, THz waves based on the one or more THz signals; and
one or more second antennas for transmitting, according to a second polarization, THz waves based on the one or more THz signals.

7. The device of claim 1, wherein the one or more RF sources are configured to generate one or more THz signals having one or more frequencies from 100 GHz to 3 THz.

8. A device for detecting a radio frequency (RF) beam, comprising:

an array of independent unit cells, each unit cell comprising:

one or more antennas for receiving terahertz (THz) waves; and one or more RF receivers coupled to the one or more antennas and configured to generate one or more THz signals based on the THz waves; and switches configured to selectively bias each unit cell between:

an activated state in which the one or more antennas of the unit cell are operable to receive the THz waves; and a deactivated state in which the one or more antennas of the unit cell are prevented from receiving the THz waves;

circuitry configured to control the switches to detect the RF beam based on the THz waves received by the one or more antennas of each unit cell in the activated state; and an injection-locking source configured to transmit an injection-locking signal to the array for assisting the one or more THz signals generated by the one or more RF receivers of each unit cell in the activated state to be coherent with the one or more THz signals generated by the one or more RF receivers of each other unit cell in the activated state.

9. The device of claim 8, wherein the array, the switches, and the controller are provided on a single integrated circuit.

10. The device of claim 8, wherein the injection-locking signal is a sub-harmonic of the one or more THz signals generated by the one or more RF receivers of each unit cell.

11. The device of claim 8, wherein:

the array, the switches, and the controller are provided on a single integrated circuit; and the injection-locking source is external to the single integrated circuit.

12. The device of claim 8, wherein, for at least one of the unit cells, the one or more antennas of the at least one unit cell comprise one or more slot antennas.

13. The device of claim 8, wherein, for at least one of the unit cells, the one or more antennas of the at least one unit cell comprise:

one or more first antennas for receiving THz waves according to a first polarization; and one or more second antennas for receiving THz waves according to a second polarization.

14. The device of claim 8, wherein the one or more RF receivers are configured to generate one or more THz signals having one or more frequencies from 100 GHz to 3 THz.

15. A method of generating a radio frequency (RF) beam, comprising:

controlling one or more switches to selectively bias each unit cell, in an array of independent unit cells, to either:

an activated state; or a deactivated state; and for each unit cell in the activated state:

generating, using one or more RF sources, one or more terahertz (THz) signals; and transmitting, using one or more antennas, THz waves based on the one or more THz signals, transmitting, using an injection-locking source, an injection-locking signal to the array for assisting the one or more THz signals generated by the one or more RF sources of each unit cell in the activated state to be coherent with the one or more THz signals generated by the one or more RF sources of each other unit cell in the activated state, wherein the RF beam is generated based on the THz waves transmitted by the one or more antennas of each unit cell in the activated state.

16. The method of claim 15, further comprising steering the generated RF beam by controlling at least one of the switches to selectively bias at least one of the unit cells from its current state to a different state.

17. A method of detecting a radio frequency (RF) beam, comprising:

controlling one or more switches to selectively bias each unit cell, in an array of independent unit cells, to either:

an activated state; or a deactivated state;

for each unit cell in the activated state:

receiving, using one or more antennas, terahertz (THz) waves; and generating, using one or more RF receivers, one or more THz signals based on the THz waves; and transmitting, using an injection-locking source, an injection-locking signal to the array for assisting the one or more THz signals generated by the one or more RF receivers of each unit cell in the activated state to be coherent with the one or more THz signals generated by the one or more RF receivers of each other unit cell in the activated state.

18. The method of claim 17, further comprising controlling at least one of the switches to selectively bias at least one of the unit cells from its current state to a different state in order improve detection of the RF beam.

\* \* \* \* \*